United States Patent [19]

Matuoka et al.

[11] Patent Number: 5,904,902
[45] Date of Patent: May 18, 1999

[54] EXHAUST PURIFIER FOR INTERNAL COMBUSTION ENGINE

[75] Inventors: Hiroki Matuoka; Masaaki Tanaka, both of Susono; Shigemitu Iisaka, Shizuoka; Michio Furuhashi, Mishima; Toshinari Nagai, Shizuoka; Tadayuki Nagai, Gotenba; Takashi Kawai, Susono; Kenji Harima, Susono; Yuuichi Gotou, Susono, all of Japan

[73] Assignee: Toyota Jidosha Kabushiki Kaisha, Aichi, Japan

[21] Appl. No.: 08/744,235

[22] Filed: Nov. 5, 1996

[30] Foreign Application Priority Data

Nov. 6, 1995 [JP] Japan ................................ 7-287689

[51] Int. Cl.⁶ ...................................................... F01N 3/10
[52] U.S. Cl. .............................................................. 422/174
[58] Field of Search ............................................... 422/174

[56] References Cited

U.S. PATENT DOCUMENTS

| | | | |
|---|---|---|---|
| 5,255,511 | 10/1993 | Maus et al. | 60/274 |
| 5,307,626 | 5/1994 | Maus et al. | 60/274 |
| 5,319,929 | 6/1994 | Cornelison et al. | 60/274 |
| 5,447,696 | 9/1995 | Harada | 422/174 |
| 5,537,321 | 7/1996 | Yoshizaki et al. | 364/431.01 |

FOREIGN PATENT DOCUMENTS

| | | |
|---|---|---|
| 5-505660 | 8/1993 | Japan . |
| 6-101459 | 4/1994 | Japan . |
| 7-101459 | 4/1994 | Japan . |
| 7-26945 | 1/1995 | Japan . |

*Primary Examiner*—Edward J. Cain
*Attorney, Agent, or Firm*—Kenyon & Kenyon

[57] ABSTRACT

An exhaust purifier for an internal combustion engine is capable of properly heating a catalyst in consideration of a deterioration with time and manufacturing variation in an electric heater that heats the catalyst.

The exhaust purifier has the catalyst 4 disposed in an exhaust pipe, the electric heater for forcibly heating the catalyst 4, a power source for supplying power to the heater, an estimate unit for estimating the temperature that the catalyst 4 will reach, a comparator for providing the difference between the estimated temperature and a target temperature, and an operation controller for controlling the operating conditions of the engine according to the temperature difference. The estimate unit measures the voltage and current of the heater, calculates the resistance or power of the heater according to the voltage and current, and estimates the temperature. The operation controller adjusts the quantity of intake air and ignition timing, or adjusts ignition timing and then the quantity of intake air to maintain an engine speed, or, if a battery 6 is abnormal, adjusts the quantity of intake air and ignition timing to increase the temperature of exhaust gas.

12 Claims, 8 Drawing Sheets

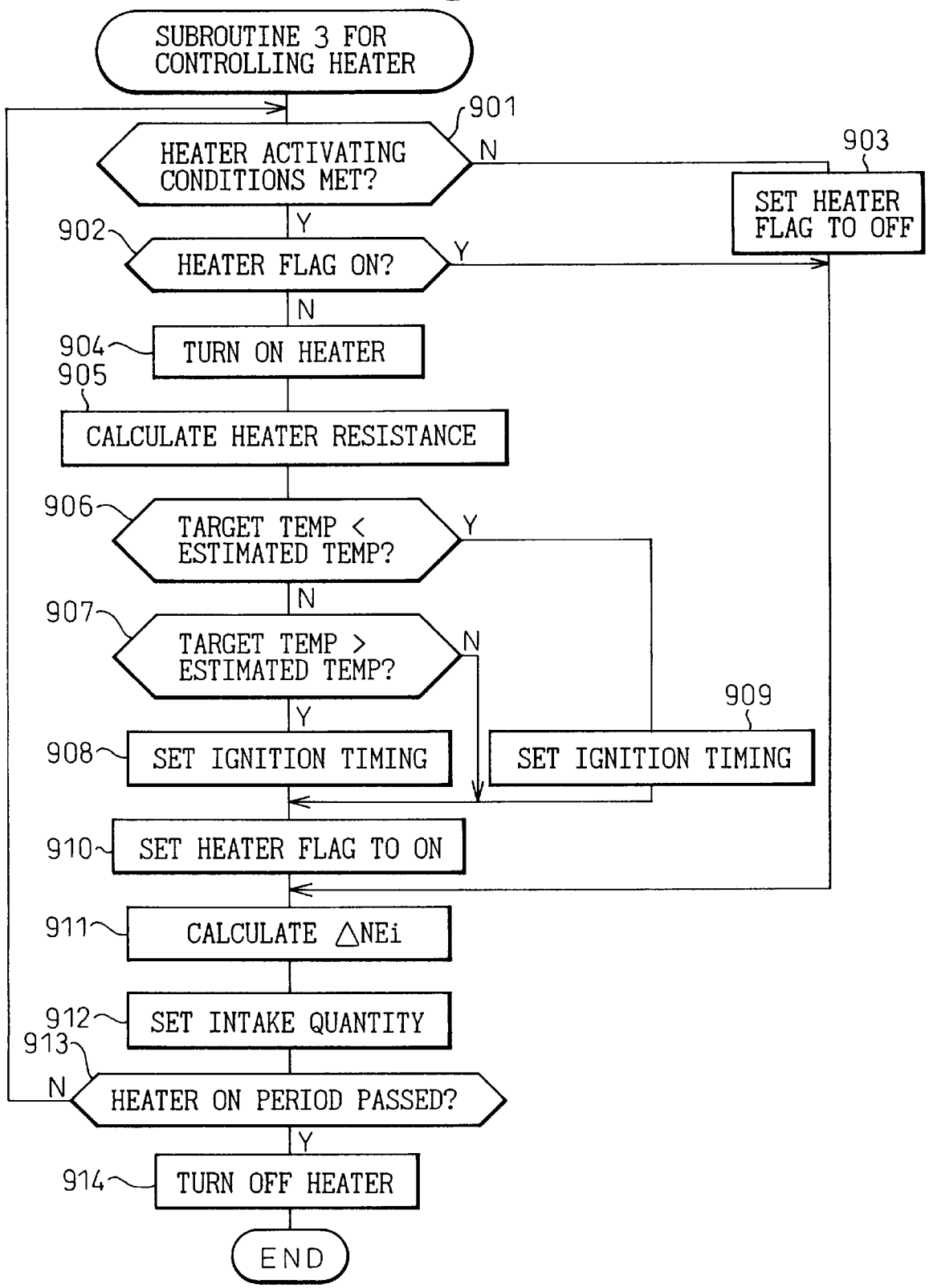

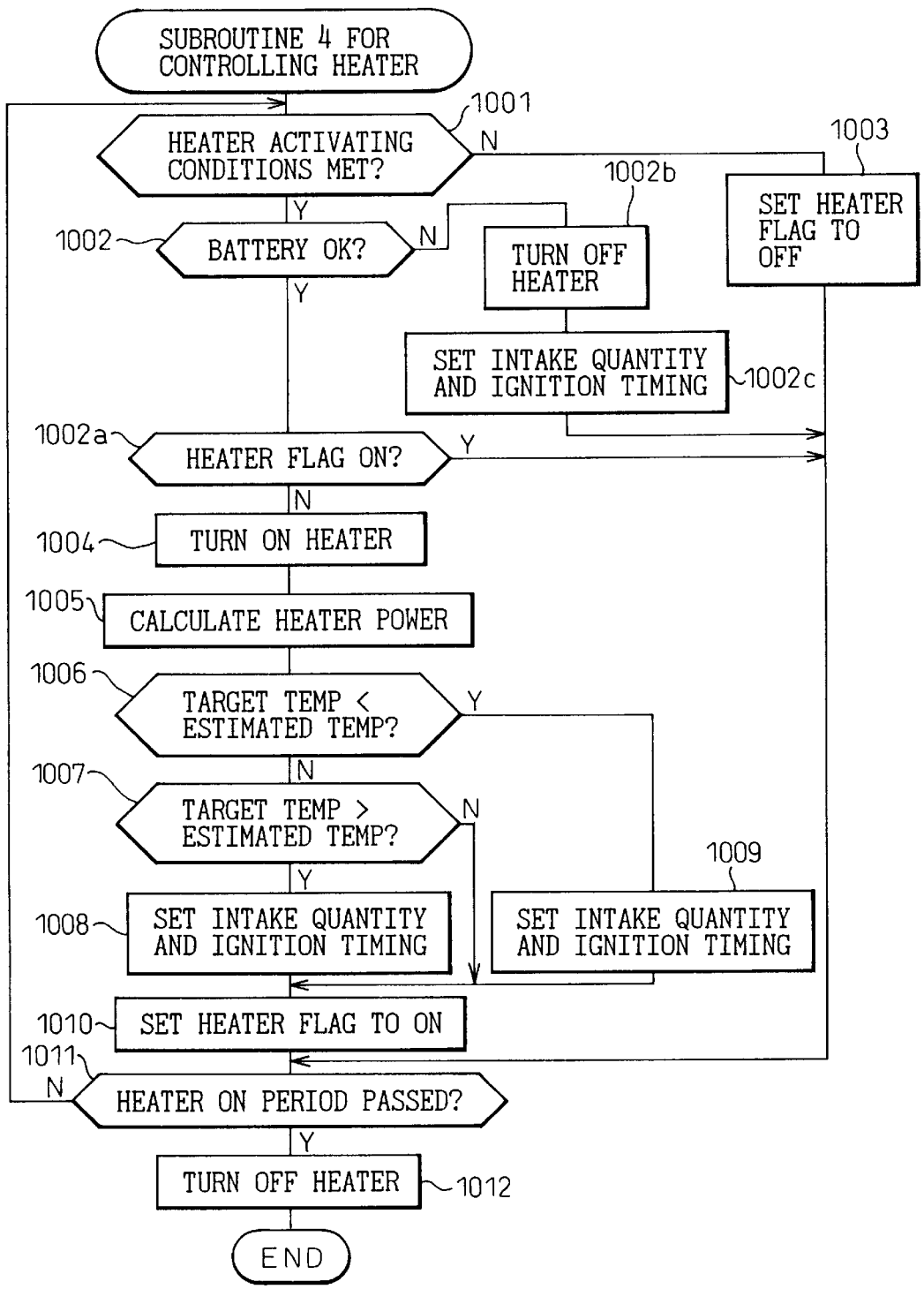

EXHAUST PURIFIER FOR INTERNAL COMBUSTION ENGINE

BACKGROUND OF THE INVENTION

1. Field of the Invention

The present invention relates to an exhaust purifier for an internal combustion engine, and particularly, to one that heats a catalyst with an electric heater in consideration of a deterioration with time and manufacturing variation in the heater.

2. Description of the Related Art

An exhaust system of an internal combustion engine employs a catalyst in an exhaust passage to remove toxic substances such as HC, CO, and NOx from the exhaust gas. The catalyst purifies exhaust gas only after it is heated above an activation temperature. To heat the catalyst, hot exhaust gas from the engine is usually used. If the engine is started from a cold state, it will take time to heat the catalyst to the activation temperature because the temperature of exhaust gas is low at first. Until the catalyst is activated, the exhaust gas is insufficiently purified.

To solve this problem, an electrically heated catalyst (EHC) has been proposed. The EHC has a catalyst and a metal carrier to which a current is applied at the start of the engine to quickly heat the catalyst up to an activation temperature. An example of the EHC is disclosed in Japanese Unexamined Patent Publication No. 5-179939. The EHC, however, consumes large amounts of power, dropping the voltage of a battery during an idling period.

To prevent such voltage drop, Japanese Unexamined Patent Publication No. 6-101459 checks an idling state and a heater operation. If the heater is operating while the engine is idling, the disclosure increases the quantity of intake air by controlling an electronic throttle or an idling speed controller (ISC) disposed in an intake system of the engine. As the quantity of intake air increases, the quantity of injected fuel increases to increase the torque and idling speed of the engine. This increases the power generated by a generator to compensate for the voltage drop of the battery.

This disclosure determines a period for operating the heater according to the temperature of cooling water of the engine without considering a deterioration with time of the heater resistance and manufacturing variation in the heater. Accordingly, the heater operating period may be too long or too short for the catalyst. As a result, the heater and the heat of exhaust gas will excessively or insufficiently heat the catalyst.

An object of the present invention is to provide an exhaust purifier for an internal combustion engine, capable of properly heating a catalyst in consideration of a deterioration with time and manufacturing variation in an electric heater that heats the catalyst.

SUMMARY OF THE INVENTION

In order to accomplish the object, the present invention, which provides an exhaust purifier for an internal combustion engine, includes a catalyst disposed in an exhaust pipe, an electric heater for forcibly heating the catalyst, and a power source for supplying power to the heater. The exhaust purifier is characterized in that it has an estimating unit for estimating a temperature the catalyst will reach, a comparator for providing the difference between the estimated temperature and a target temperature, and an operation controller for controlling the operating conditions of the engine according to the temperature difference.

The present invention also measures the voltage and current of the heater, calculates the resistance of the heater according to the voltage and current, and estimates the temperature that the catalyst will reach according to the resistance.

The present invention also measures the voltage and current of the heater, calculates the power of the heater according to the voltage and current, and estimates the temperature that the catalyst will reach according to the power.

The present invention also adjusts the quantity of intake air and ignition timing according to the temperature difference between the estimated and target temperatures.

Increasing the quantity of intake air increases the quantity of injecting fuel because the air-fuel ratio of the engine is controlled to be unchanged. This increases an engine speed and the temperature of exhaust gas to quickly heat the catalyst up to an activation temperature. Delaying the ignition timing of the engine delays the start of combustion in each cylinder and speeds up the opening of each exhaust valve. This also increases the temperature of exhaust gas to quickly heat the catalyst up to the activation temperature.

The present invention also adjusts the ignition timing of the engine and then the quantity of intake air to maintain an engine speed.

Delaying the ignition timing of the engine delays the start of combustion in each cylinder and speeds up the opening of each exhaust valve, to increase the temperature of exhaust gas. The exhaust gas heats and quickly activates the catalyst. This, however, reduces the torque and speed of the engine. Accordingly, the fifth aspect increases the quantity of intake air to maintain a given engine speed.

Upon occurrence of an abnormal state in which no power is supplied to the heater, the present invention also adjusts the operating conditions of the engine to increase the temperature of exhaust gas.

Power supply to the heater will be cut if, for example, a power source voltage drops too low or a break occurs in the heater. In this case, the sixth aspect increases the quantity of intake air and delays ignition timing, to increase the temperature of exhaust gas.

BRIEF DESCRIPTION OF THE DRAWINGS

FIG. 9 is a flowchart showing a subroutine of controlling the heater according to a third embodiment of the present invention; and FIG. 10 is a flowchart showing a subroutine of controlling the heater according to a fourth embodiment of the present invention.

DESCRIPTION OF THE PREFERRED EMBODIMENTS

Figure 1:
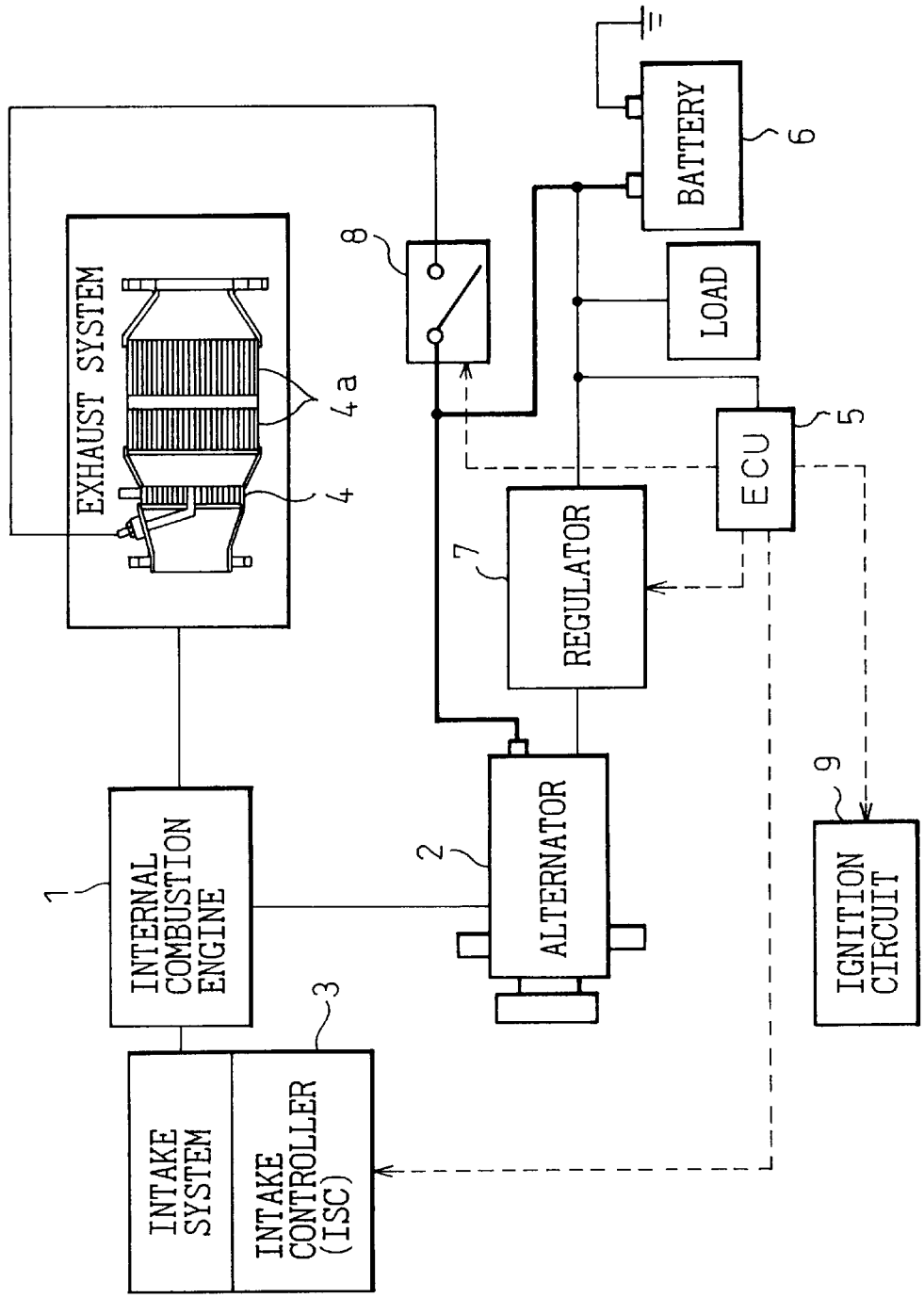
FIG. 1 shows an exhaust purifier having an electrically heated catalyst and a heater for heating the catalyst, according to an embodiment of the present invention.

FIG. 1 shows an exhaust purifier of an internal combustion engine according to an embodiment of the present invention. The exhaust purifier involves an alternator 2 driven by the engine 1, an intake controller 3, disposed in an intake system of the engine 1, to control the quantity of intake air, and an electrically heated catalyst (EHC) 4 disposed in an exhaust system of the engine 1. The EHC 4 has an electric heater for heating the same. A three-way catalyst 4a is disposed in the exhaust system downstream from the EHC 4. The three-way catalyst 4a has no heater and is heated by the heat of exhaust gas. The intake controller 3 may be an electronic throttle that responds to an accelerator or to an electronic control unit 5, to drive a stepping motor in a forward or reverse direction to increase or decrease the quantity of intake air. The intake controller 3 may be an idling speed controller (ISC) to be explained later. The control unit 5 may be a microcomputer having a CPU, a ROM, a RAM, an input interface, an output interface, and a bus line to connect the components to one another. The control unit 5 controls fuel injection, ignition timing, and the power supply to the heater.

An airflow meter (not shown) is arranged in an intake duct, to provide a voltage signal in proportion to the quantity of intake air. A water temperature sensor (not shown) is attached to a water jacket (not shown) of the engine 1, to provide a voltage signal in proportion to the temperature of cooling water of the engine 1. A voltmeter (not shown) is connected in parallel with a battery 6, to provide a signal representing a terminal voltage of the battery 6. These signals are supplied to the input interface of the control unit 5. A terminal voltage of the heater is equal to the terminal voltage of the battery 6 and is supplied to the input interface of the control unit 5. A current passing through the heater is detected as a terminal voltage of a resistor connected in series with the heater and is supplied to the input interface of the control unit 5. A crank angle sensor (not shown) is attached to a distributor (not shown) of the engine 1 and provides a signal representing a crank angle. This signal is also supplied to the input interface of the control unit 5 and is used to calculate an engine speed.

The output interface of the control unit 5 provides the intake controller 3 with a signal to change the quantity of intake air, a regulator 7 with a signal to change the field current of the alternator 2, a switch 8 with a control signal to turn on/off the heater, and an ignition circuit 9 connected to an ignition plug with an ignition signal for each cylinder.

The heater is integral with the EHC (electrically heated catalyst) 4 and is connected to a power source. The power source consists of the alternator 2 and battery 6 connected in parallel with each other. A temperature detected by the water temperature sensor and an engine speed NE calculated according to the output of the crank angle sensor are used to determine whether or not the EHC 4 is active. The regulator 7 changes the magnetic field of the alternator 2, to change the generated power. The switch 8 may be a control relay that connects the power source to the EHC 4 when the EHC 4 is inactive.

The battery 6 always receives power from the alternator 2 and supplies power to the EHC 4, control unit 5, regulator 7, and other parts. The regulator 7 increases the field current of the alternator 2 if the voltage of the battery 6 drops due to load. The field current of the alternator 2 is changeable by controlling the duty factor thereof. The switch 8 has a resistor (not shown) connected in series with the heater of the EHC 4, to detect a current flowing from the power source to the heater. The resistor is electrically connected to the control unit 5, which calculates the current to the heater according to a terminal voltage of the resistor. The battery 6 is electrically connected to the control unit 5, which calculates the resistance and power of the heater according to a terminal voltage of the battery 6 and the current to the heater calculated according to the terminal voltage of the resistor. Alternatively, the current to the heater may be calculated with the use of a current transformer (CT).

Closing and opening the switch 8 will be explained.

When the control unit 5 determines that the EHC 4 is inactive, the switch 8 is closed to supply power from the power source to the EHC 4. Since the alternator 2 supplies power to the battery 6, the control unit 5 controls the regulator 7 to control the field current of the alternator 2 so that the output voltage of the alternator 2 is about 14 V or below. Once the EHC 4 is activated, the control unit 5 opens the switch 8 to disconnect the EHC 4 from the power source.

The ignition circuit 9 is connected to the ignition plug (not shown) of each cylinder (not shown) of the engine 1. The control unit 5 controls the ignition circuit 9 to fire each ignition plug at a timing that is determined according to the output of the crank angle sensor.

Figure 2:
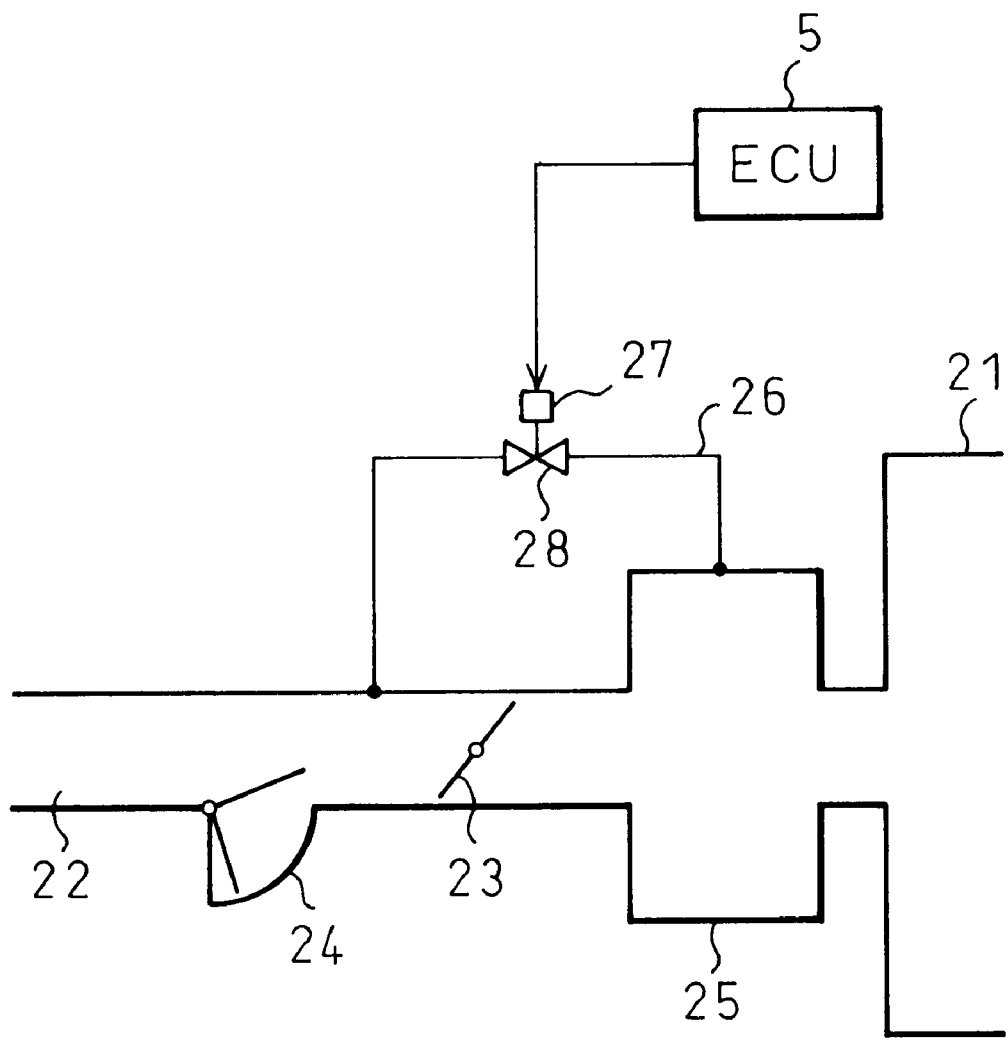
FIG. 2 shows an idling speed controller (ISC)

An example of the idling speed controller (ISC) which may serve as the intake controller 3 will be briefly explained with reference to FIG. 2.

The idling speed controller involves an engine 21, an intake duct 22, a throttle valve 23, an airflow meter 24, and a surge tank 25. A bypass 26 bypasses the throttle valve 23, to connect a part of the intake duct 22 between the throttle valve 23 and the airflow meter 24 with the surge tank 25. An idling speed control valve 28 is arranged in the bypass 26 and is driven by an actuator 27 such as a stepping motor. The actuator 27 is connected to, for example, the output interface of the control unit 5 of FIG. 1, so that the control unit 5 controls the opening of the valve 28 through the actuator 27, to control the quantity of intake air independently of the throttle valve 23.

Subroutines of controlling the heater according to the embodiments of the present invention will be explained.

Figure 3:
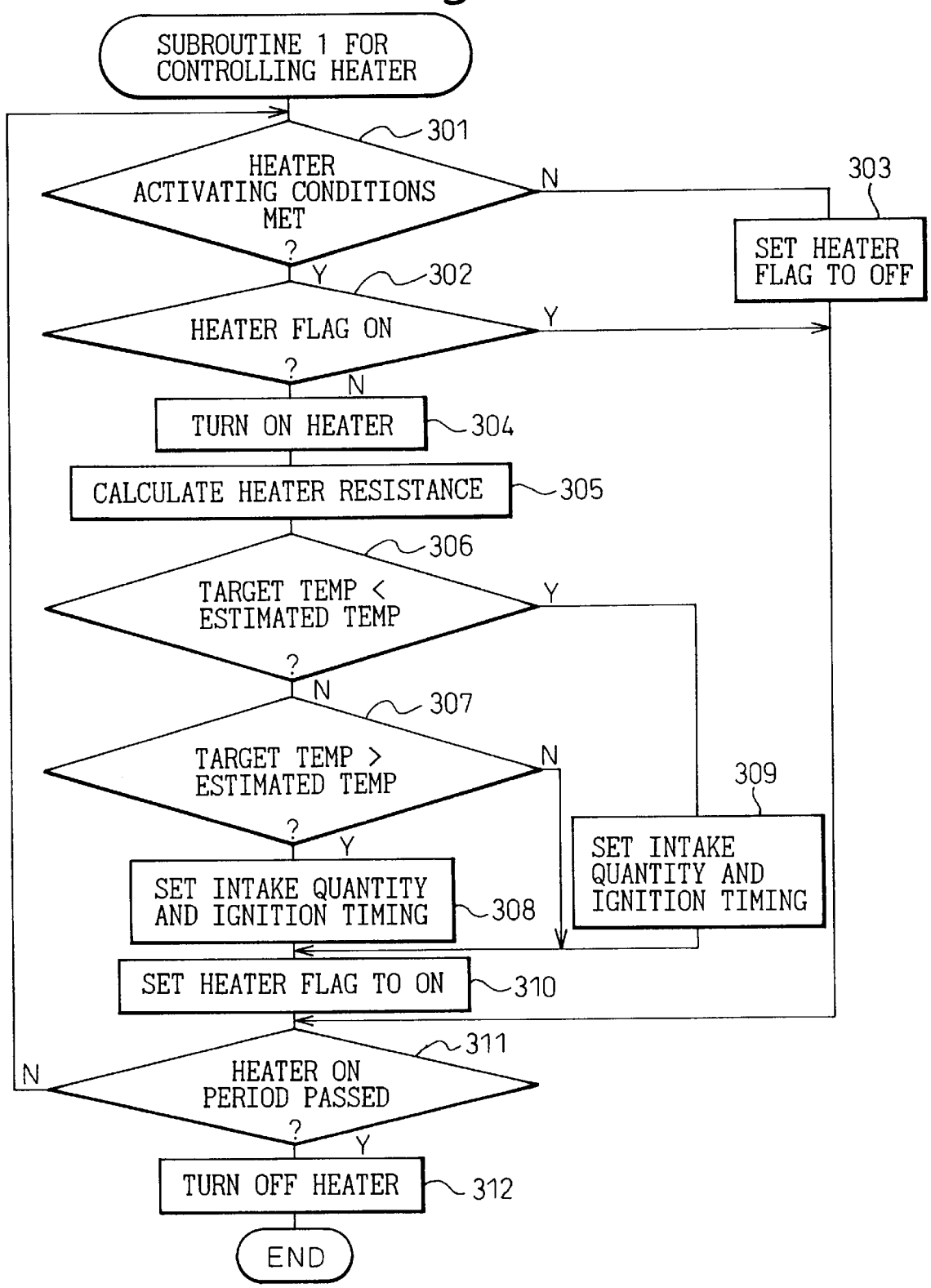
FIG. 3 is a flowchart showing a subroutine of controlling the heater according to a first embodiment of the present invention.

FIG. 3 is a flowchart showing a subroutine of controlling the heater according to the first embodiment. The subroutines mentioned below are each carried out at intervals of 100 ms. Step 301 determines whether or not conditions to activate the heater are met. If they are met, step 302 is carried out, and if not, step 303 is carried out. The heater activating conditions which must all be met are −10° C.<THW<35° C. where THW is the temperature of cooling water of the engine 1, NE>500 rpm where NE is an engine speed, BAT>10 V where BAT is the voltage of the battery 6, and a heater break flag indicating a break in the heater is off. Step 302 checks a heater flag to see if the heater is ON. If the heater is ON, the subroutine ends, and if not, step 304 is carried out. Step 303 resets the heater flag to OFF because the heater activating conditions are not completely met. Step 304 turns on the heater through the switch 8 and calculates a heater ON period corresponding to the engine speed NE and water temperature THW based on a map (not shown). Step 304 sets a timer for the heater ON period. Step 305 reads a terminal voltage of the heater and a current passing the heater and calculates the resistance of the heater accordingly. The resistance or power of the heater is used to look up a map to estimate a temperature the EHC 4 will attain after the heater ON period. This map will be explained before explaining step 306.

Figure 4:
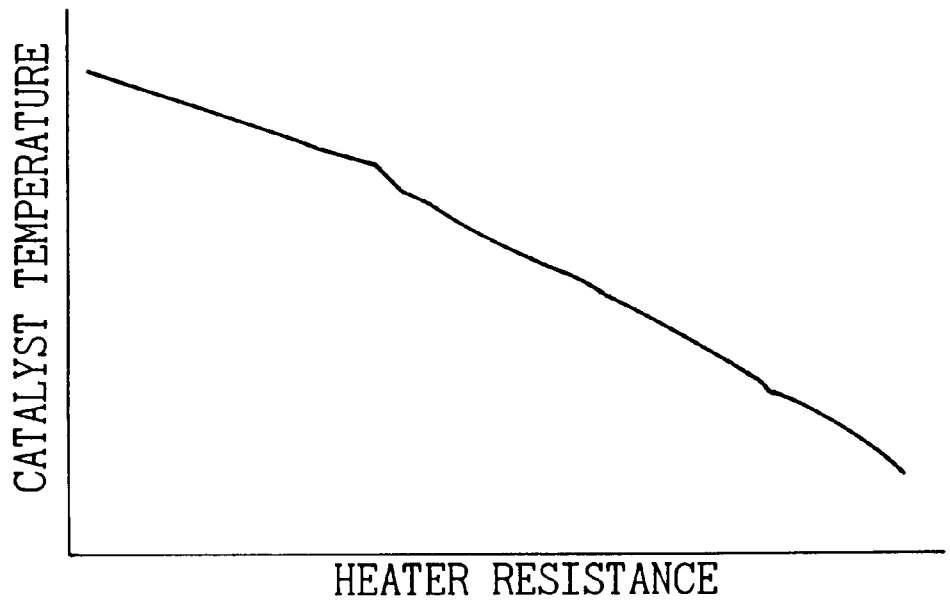
FIG. 4 shows a map used to estimate the temperature of the catalyst according to the resistance of the heater.
Figure 5:
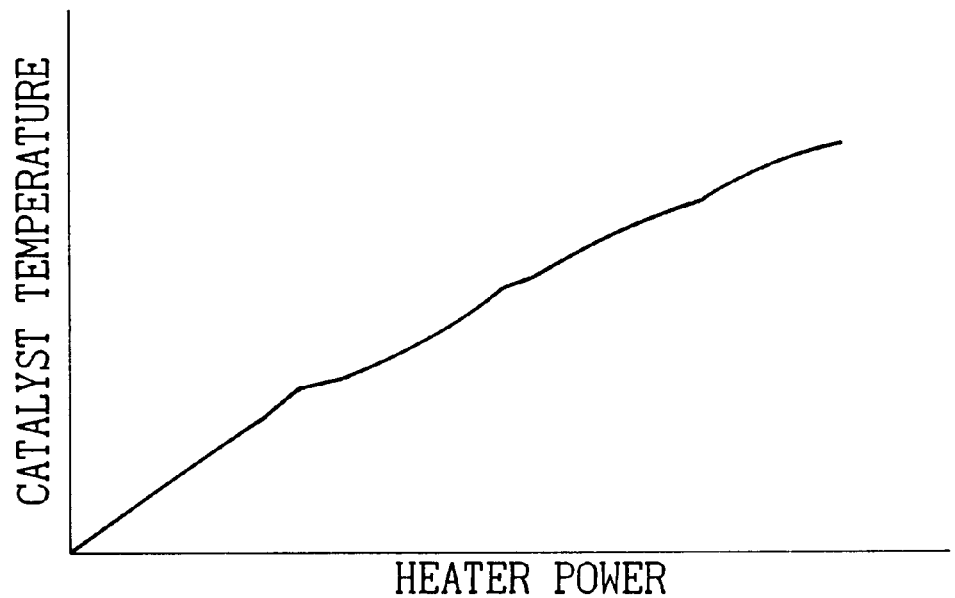
FIG. 5 shows a map used to estimate the temperature of the catalyst according to the power of the heater.

FIG. 4 shows the map used to estimate a temperature the EHC 4 will reach at the end of the heater ON period according to the resistance of the heater, and FIG. 5 shows the map to estimate the same according to the power of the heater. These maps and step 305 correspond to the estimate means of the present invention. The map of FIG. 4 is prepared by energizing heaters having different resistance values from a cold start and measuring the temperature of EHC 4 for each heater after about 20 seconds of energization. The map is stored in a ROM. The map of FIG. 5 is prepared by energizing heaters having different power levels from a cold start and measuring the temperature of the EHC 4 for each heater after about 20 seconds of energization. The map is stored in the ROM.

Returning to the flowchart of FIG. 3, steps 306 and 307 correspond to the difference providing means of the present invention.

Step 306 determines whether or not the estimated temperature of the heater found from the map shown in FIG. 4 based on the heater resistance calculated in step 305 is above a target temperature. If the estimated is above the target, step 309 is carried out, and if not, step 307 is carried out. The target temperature is equal to the activation temperature of the EHC 4, which is usually 400° C. Step 307 determines whether or not the estimated temperature is below the target temperature. If the estimated is below the target, step 308 is carried out, and if not, i.e., if the estimated is equal to the target, step 310 is carried out. Steps 308 and 309 correspond to the control means of the present invention to adjust the quantity of intake air and ignition timing according to the difference between the estimated and target temperatures.

In step 308, the target temperature minus the estimated temperature is positive, and therefore, the EHC 4 must be heated more quickly than usual. Therefore, step 308 finds an increase in the quantity of intake air according to the difference between the target and estimated temperatures from the map shown in FIG. 6, and the intake controller 3 increases the quantity of intake air accordingly. At this time, the quantity of injecting fuel is also increased because the air-fuel ratio of the engine 1 is controlled to be unchanged. Consequently, the engine speed increases to increase the temperature of exhaust gas to heat the EHC 4 up to the activation temperature more quickly than usual. In addition, step 308 finds ignition timing from a map of FIG. 7 according to the difference between the target and estimated temperatures. The ignition timing to be selected is on the delay side of TDC as compared with usual and corresponds to, for example, a crank angle of 5 degrees advanced from TDC. This results in delaying the start of combustion in each cylinder and speeding up the opening of each exhaust valve, thereby increasing the temperature of exhaust gas to quickly heat the EHC 4 up to the activation temperature.

In step 309, the target temperature minus the estimated temperature is negative, and therefore, it is not necessary to quickly heat the EHC 4. Step 309 calculates a reduction in the quantity of intake air by looking up the map of FIG. 6 according to the difference between the target and estimated temperatures. Also, step 309 calculates normal ignition timing by looking up the map of FIG. 7 according to the difference between the target and estimated temperatures. The ignition timing corresponds to, for example, a crank angle of 10 degrees on the advance side of TDC. As a result, the intake controller 3 reduces the quantity of intake air. At this time, the quantity of injected fuel is reduced because the air-fuel ratio of the engine 1 is controlled to be unchanged. Then, the engine speed slows down to decrease the temperature of exhaust gas, to slowly heat the EHC 4 up to the activation temperature. Step 310 sets the heater flag to ON. In the next cycle of the subroutine, step 301 determines that the heater activating conditions are all met, and step 302 determines that the heater flag is ON. Namely, steps 304 to 310 are carried out once. Step 311 determines whether or not the timer set in step 304 has counted the heater ON period. If the heater ON period has elapsed, step 312 is carried out, and if not, step 301 is again carried out. Step 312 turns off the heater and terminates the subroutine.

In this way, the first embodiment calculates the resistance of the heater and estimates a temperature the EHC 4 will attain by looking up the map of FIG. 4 according to the resistance. If the estimated temperature is lower than a target temperature, the embodiment increases the quantity of intake air according to the map of FIG. 6, to increase the engine speed and the temperature of exhaust gas. At the same time, the embodiment delays ignition timing according to the map of FIG. 7, to increase the temperature of exhaust gas. This results in heating the EHC 4 up to the activation temperature more quickly than usual. If the estimated temperature is higher than the target temperature, the embodiment decreases the quantity of intake air according to the map of FIG. 6 and selects normal ignition timing according to the map of FIG.7, to decrease the engine speed and the temperature of exhaust gas. As a result, the EHC 4 slowly reaches the activation temperature.

Figure 8:
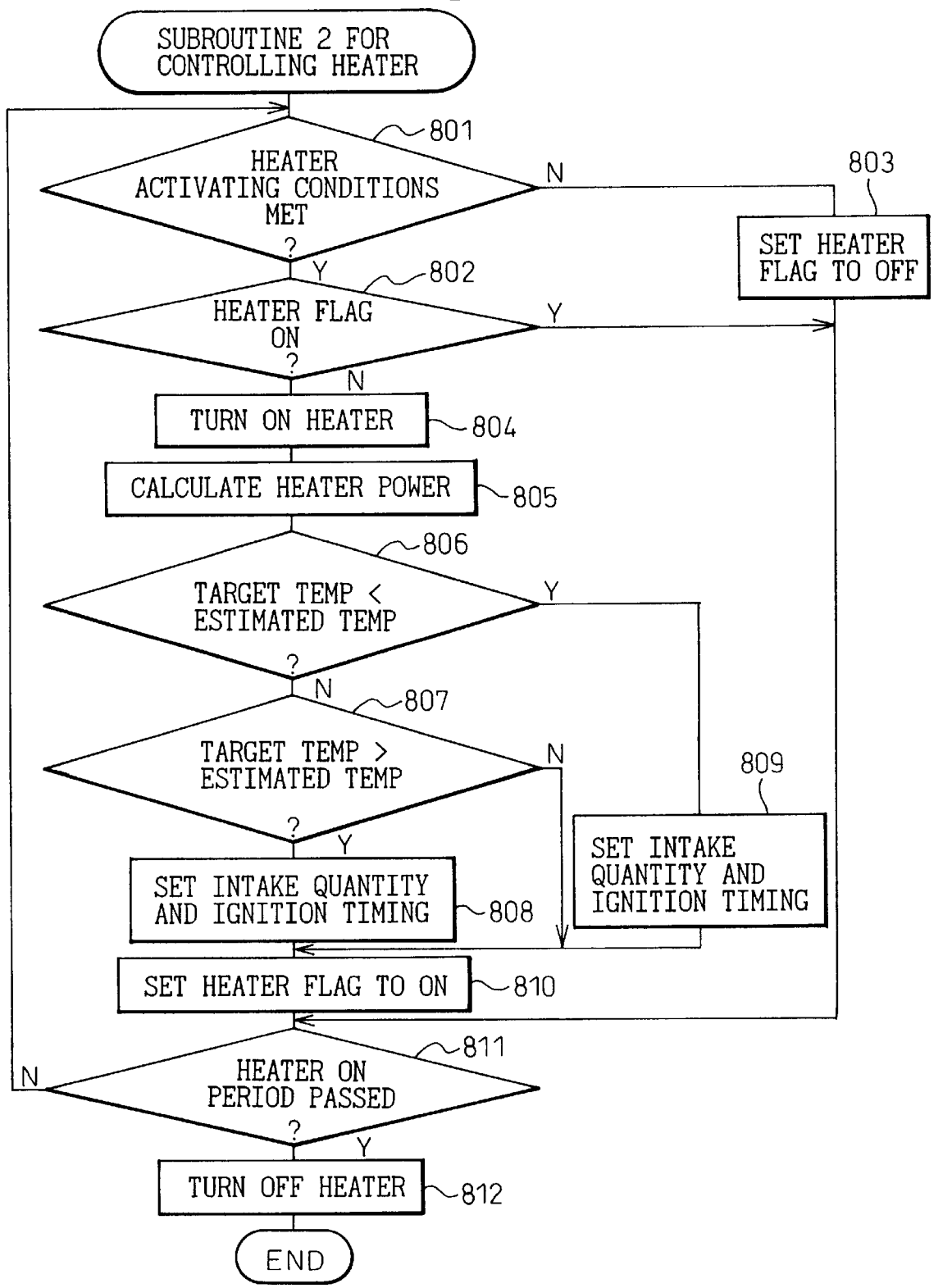
FIG. 8 is a flowchart showing a subroutine of controlling the heater according to a second embodiment of the present invention.

FIG. 8 is a flowchart showing a subroutine of controlling the heater according to the second embodiment of the present invention. Steps 801 to 812 of FIG. 8 are the same as steps 301 to 312 of FIG. 3, respectively, except steps 805 to 807, and therefore, only steps 805 to 807 will be explained. Step 805 reads a terminal voltage of the heater as well as a current flowing to the heater and calculates the power of the heater accordingly. The calculated power is used to estimate a temperature the EHC 4 will attain according to the map of FIG. 5. The estimated temperature is used in steps 806 and 807.

Figure 6:
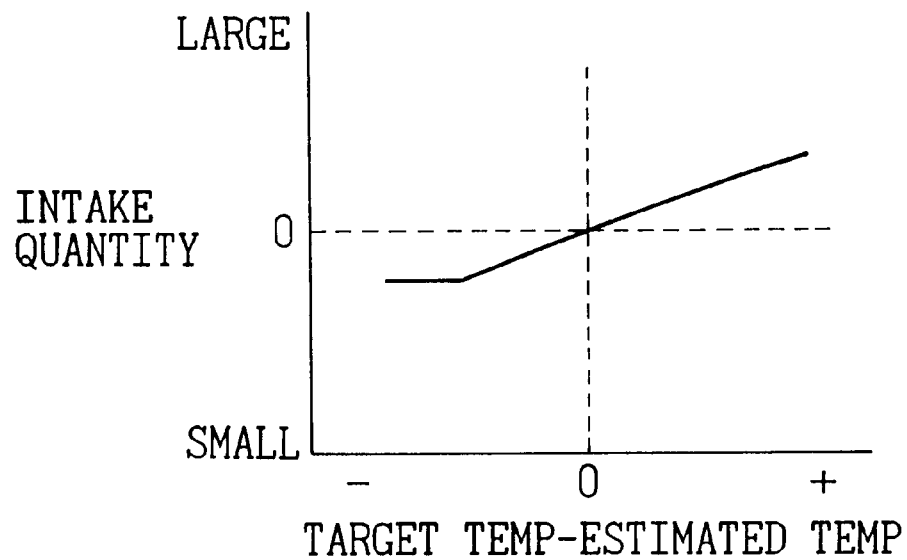
FIG. 6 shows a map used to calculate the quantity of intake air according to the difference between the target and estimated temperatures of the heater.
Figure 7:
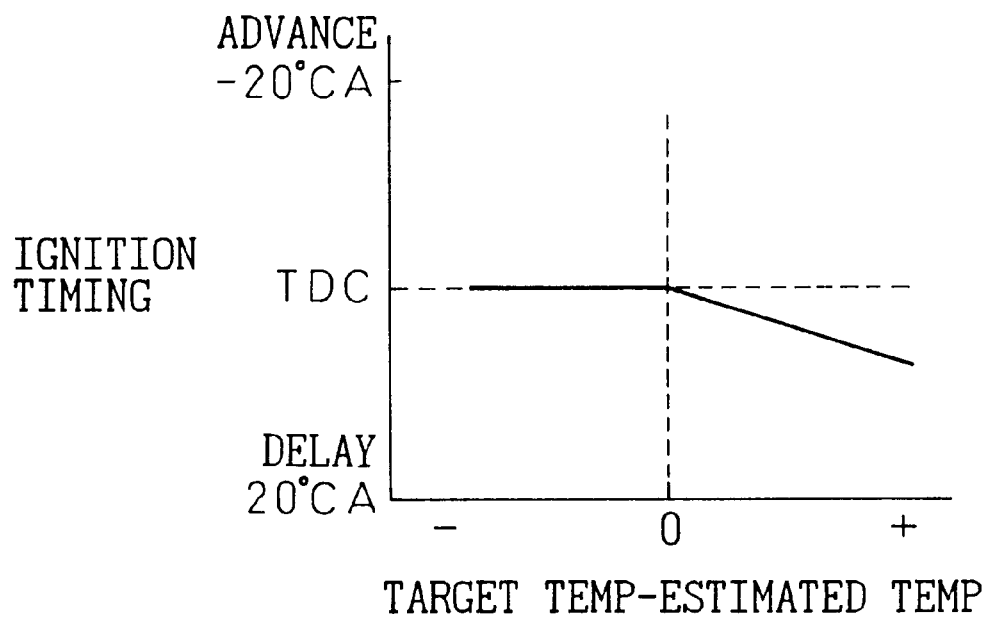
FIG. 7 shows a map used to calculate ignition timing according to the difference between target and estimated temperatures of the heater.

If the estimated temperature is lower than a target temperature, the embodiment increases the quantity of intake air according to the map of FIG. 6, to increase the engine speed and the temperature of exhaust gas. At the same time, the embodiment delays ignition timing according to the map of FIG. 7, to increase the temperature of exhaust gas. As a result, the EHC 4 is heated to the activation temperature more quickly than usual. If the estimated temperature is higher than the target temperature, the embodiment decreases the quantity of intake air according to the map of FIG. 6 and selects normal ignition timing according to the map of FIG. 7, to decrease the engine speed and the temperature of exhaust gas. As a result, the EHC 4 slowly reaches the activation temperature.

FIG. 9 is a flowchart showing a subroutine of controlling the heater according to the third embodiment of the present invention. The steps of FIGS. 3 and 9 basically correspond to each other. Steps specific to the third embodiment will be explained. Steps 908 and 909 only adjust the ignition timing without adjusting the quantity of intake air. Steps 911 and 912 are additional, and therefore, steps 913 and 914 correspond to steps 311 and 312, respectively. Step 911 calculates $\Delta NEi=NEi\text{-}1-NEi$ where $NEi\text{-}1$ is an engine speed in the preceding cycle and $NEi$ is an engine speed of this cycle. Step 912 controls the intake controller 3 to increase the quantity of intake air if ΔNEi is positive and decrease the same if ΔNEi is negative. Step 913 determines whether or not the timer set in step 904 has counted a heater ON period. If the heater ON period has elapsed, step 914 is carried out, and if not, step 901 is repeated. Step 914 turns off the heater and terminates the subroutine. In this way, the third embodiment calculates the resistance of the heater and estimates a temperature the EHC 4 will attain by looking up the map of FIG. 5 according to the resistance. If the estimated temperature is lower than a target temperature, the third embodiment delays ignition timing according to the map of FIG. 7, to increase the temperature of exhaust gas, so that the EHC 4 may reach the activation temperature more quickly than usual. If the estimated temperature is higher than the target temperature, the embodiment selects normal ignition timing according to the map of FIG. 7 to maintain the combustion state of the engine 1 and the temperature of exhaust gas. As a result, the EHC 4 reaches the activation temperature as usual. When delaying the ignition timing, the embodiment controls the quantity of intake air not to change the engine speed NE. Namely, the embodiment delays only the ignition timing to increase the temperature of exhaust gas, and corrects the quantity of intake air not to change the engine speed NE.

FIG. 10 is a flowchart showing a subroutine of controlling the heater according to the fourth embodiment of the present invention. This embodiment differs from the third embodiment of FIG. 8 in steps 1002, 1002a, 1002b, and 1002c. Step 1002 determines whether or not the battery 6 is normal according to whether or not the voltage BAT of the battery 6 is above 11 V. If the battery 6 is normal, step 1002a is carried out, and if not, step 1002b is carried out. Step 1002a checks the heater flag to see if the heater is ON. If the heater is ON, step 1011 is carried out, and if not, step 1004 is carried out. Step 1002b turns off the heater through the switch 8 because the battery 6 is abnormal. Step 1002c increases the quantity of intake air to increase the engine speed and the temperature of exhaust gas. At the same time, step 1002c delays ignition timing to increase the temperature of exhaust gas. As a result, the EHC 4 is heated to the activation temperature more quickly than usual.

As explained above in detail, the exhaust purifier of the present invention has the estimate unit for estimating the temperature that the electrically heated catalyst will reach, the comparator for providing the difference between the estimated temperature and a target temperature, and the operation controller for controlling the operating conditions of the engine according to the temperature difference. The invention properly heats the catalyst in consideration of a deterioration with time and manufacturing variation in the heater. If the heater has high resistance, it will insufficiently heat the catalyst. Accordingly, the invention controls the operating conditions of the engine to increase the temperature of exhaust gas, to supplement the heater and properly and quickly heat the catalyst. If the heater has low resistance, it will excessively heat the catalyst. Accordingly; the invention controls the operating conditions of the engine to decrease the temperature of exhaust gas, to moderate the heater and properly heat the catalyst. The invention prevents the unnecessary use of the heater and battery, thereby extending the durability of the catalyst, heater, and battery. The present invention also estimates the temperature that the catalyst will attain according to the resistance of the heater, estimates the same according to the power of the heater, and adjusts the quantity of intake air and ignition timing to properly heat the catalyst.

The present invention also delays the ignition timing of the engine and then increases the quantity of intake air to maintain a given engine speed, so that the driver may not feel uncomfortable.

If an abnormal state of supplying no power to the heater occurs, the present invention also increases the quantity of intake air and delays ignition timing, to increase the temperature of exhaust gas and quickly heat the catalyst.

Although the present invention has been disclosed and described by way of embodiments, it will be apparent to those skilled in the art that other embodiments and modifications of the present invention are possible without departing from the spirit or essential features thereof.

What is claimed is:

1. An apparatus for purifying an exhaust gas of an internal combustion engine, having a catalyst disposed in an exhaust pipe, heating means for forcibly heating the catalyst, and a power source for supplying power to the heating means, comprising:

means for estimating a temperature that the catalyst will reach after the catalyst has been heated by the heating means for a predetermined time;

means for determining a difference between the estimated temperature and a target temperature required to adequately activate the catalyst; and means for controlling operating conditions of the engine to reduce the temperature difference.

2. The apparatus of claim 1, wherein the estimating means measures a voltage applied to and a current passing through the heating means, calculates the resistance of the heating means according to the voltage and current, and estimates the temperature the catalyst will reach according to the resistance.

3. The apparatus of claim 1, wherein the estimating means measures a voltage applied to and a current passing through the heating means, calculates the power of the heating means according to the voltage and current, and estimates the temperature the catalyst will reach according to the power.

4. The apparatus of claim 2, wherein the control means adjusts the quantity of intake air and ignition timing of the engine according to the temperature difference.

5. The apparatus of claim 3, wherein the control means adjusts the quantity of intake air and ignition timing of the engine according to the temperature difference.

6. The apparatus of claim 4, wherein the control means adjusts the ignition timing of the engine and then the quantity of intake air to maintain an engine speed.

7. The apparatus of claim 5, wherein the control means adjusts the ignition timing of the engine and then the quantity of intake air to maintain an engine speed.

8. The apparatus according to claim 1, wherein, upon occurrence of an abnormal state of in which no power is supplied to the heating means, the control means adjusts the operating conditions of the engine to increase a temperature of exhaust gas above a temperature of the exhaust gas in a normal state during which power is supplied to the heating means.

9. The apparatus according to claim 4, wherein, upon occurrence of an abnormal state in which no power is supplied to the heating means, the control means adjusts the operating conditions of the engine to increase a temperature of exhaust gas above a temperature of the exhaust gas in a normal state during which power is supplied to the heating means.

10. The apparatus according to claim 5, wherein, upon occurrence of an abnormal state in which no power is supplied to the heating means, the control means adjusts the operating conditions of the engine to increase temperature of exhaust gas above a temperature of the exhaust gas in a normal state during which power is supplied to the heating means.

11. The apparatus according to claim 6, wherein, upon occurrence of an abnormal state in which no power is supplied to the heating means, the control means adjusts the operating conditions of the engine to increase a temperature of exhaust gas above a temperature of the exhaust gas in a normal state during which power is supplied to the heating means.

12. The apparatus according to claim 7, wherein, upon occurrence of an abnormal state in which no power is supplied to the heating means, the control means adjusts the operating conditions of the engine to increase a temperature of exhaust gas above a temperature of the exhaust gas in a normal state during which power is supplied to the heating means.

* * * * *

UNITED STATES PATENT AND TRADEMARK OFFICE
CERTIFICATE OF CORRECTION

PATENT NO. : 5,904,902
DATED : May 18, 1999
INVENTOR(S) : Hiroki MATUOKA, et al.

It is certified that error appears in the above-indentified patent and that said Letters Patent is hereby corrected as shown below:

Column 2, line 15, change "injecting" to --injected--.

Column 8, line 55, delete "of" after "state".

Column 9, line 4, after "increase" insert --a--.

Signed and Sealed this

Twenty-third Day of May, 2000

Attest:

Q. TODD DICKINSON

*Attesting Officer*    *Director of Patents and Trademarks*